(12) United States Patent
Shearon et al.

(10) Patent No.: US 6,249,446 B1
(45) Date of Patent: Jun. 19, 2001

(54) CASCADABLE, HIGH EFFICIENCY CHARGE PUMP CIRCUIT AND RELATED METHODS

(75) Inventors: William Brandes Shearon, Findlay, OH (US); Salomon Vulih, Neshanic Station; Robert Haynes Isham, Flemington, both of NJ (US)

(73) Assignee: Intersil Americas Inc., Irvine, CA (US)

( * ) Notice: Subject to any disclaimer, the term of this patent is extended or adjusted under 35 U.S.C. 154(b) by 0 days.

(21) Appl. No.: 09/645,070

(22) Filed: Aug. 23, 2000

(51) Int. Cl.[7] .................................................. H02M 3/18
(52) U.S. Cl. ................................................................ 363/60
(58) Field of Search .................................. 363/59, 60, 61; 307/110; 327/536

(56) References Cited

U.S. PATENT DOCUMENTS

| | | | |
|---|---|---|---|
| 5,397,928 | * 3/1995 | Chan et al. | 307/109 |
| 5,581,455 | 12/1996 | Rossi et al. | 363/60 |
| 5,635,776 | 6/1997 | Imi | 307/110 |
| 5,650,671 | 7/1997 | Pascucci et al. | 307/110 |
| 5,680,300 | * 10/1997 | Szepesi et al. | 363/59 |
| 5,774,348 | * 6/1998 | Druce et al. | 363/60 |
| 5,808,883 | * 9/1998 | Hawkes | 363/60 |
| 5,926,059 | 7/1999 | Brani et al. | 327/536 |
| 5,939,866 | * 8/1999 | Bjorkengren | 323/266 |
| 6,160,723 | * 12/2000 | Liu | 363/60 |
| 6,169,444 | * 1/2001 | Thurber, Jr. | 327/536 |

* cited by examiner

*Primary Examiner*—Adolf Deneke Berhane
(74) *Attorney, Agent, or Firm*—Allen Dyer, Doppelt, Milbrath & Gilchrist, P.A.

(57) ABSTRACT

A charge pump circuit includes a plurality of pumping capacitors, a plurality of switches connected to the pumping capacitors, and a controller for generating first and second sets of switch control signals for controlling the switches so that the pumping capacitors generate either an increased or a negative output voltage. The controller includes a clock having first outputs for the first set of switch control signals, a transient clamp network having second outputs for the second set of switch control signals, and a respective level shifting capacitor connected between each first output and a corresponding second output and cooperating with the transient clamp network so that the second set of signals is level shifted from the first set.

22 Claims, 5 Drawing Sheets

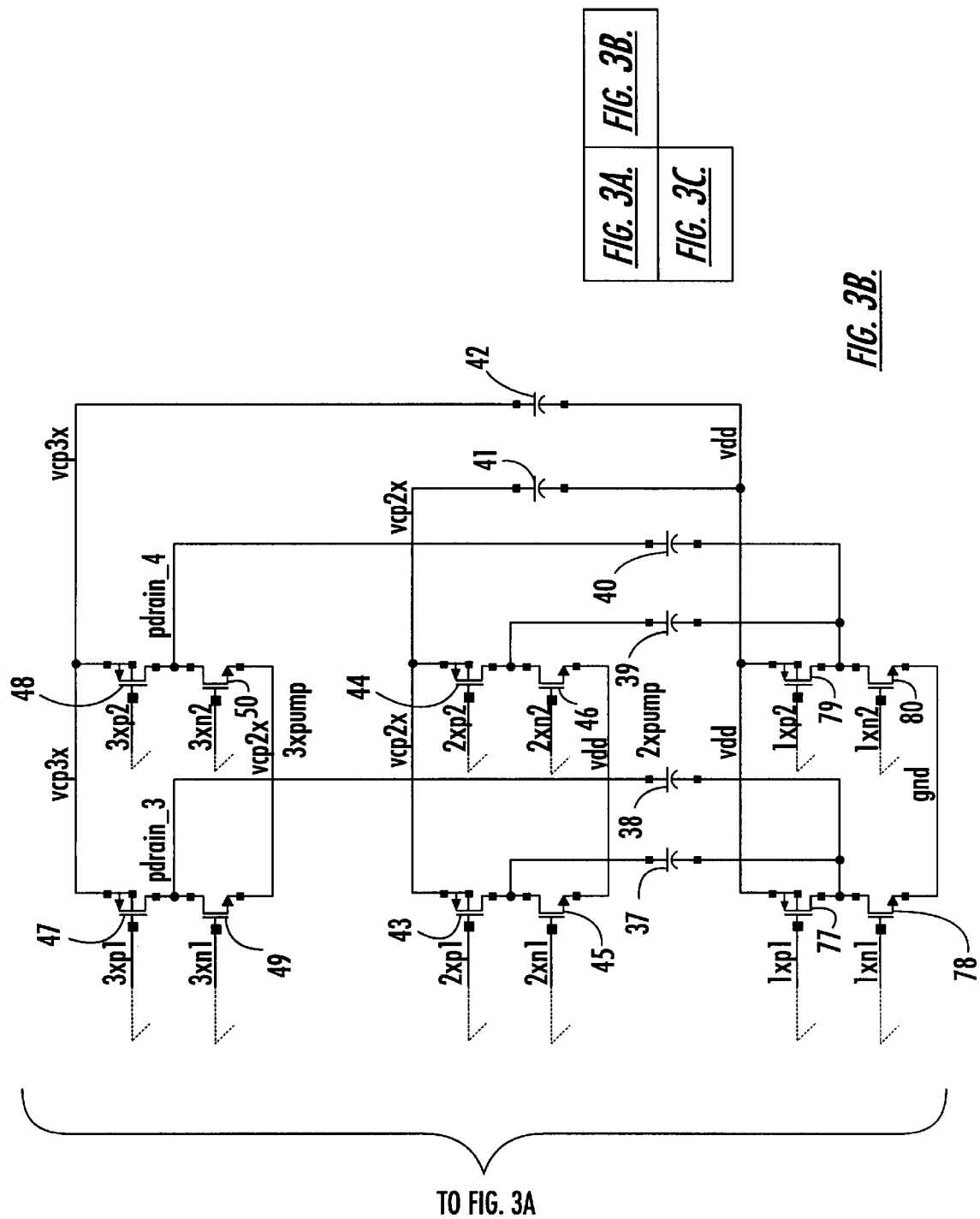

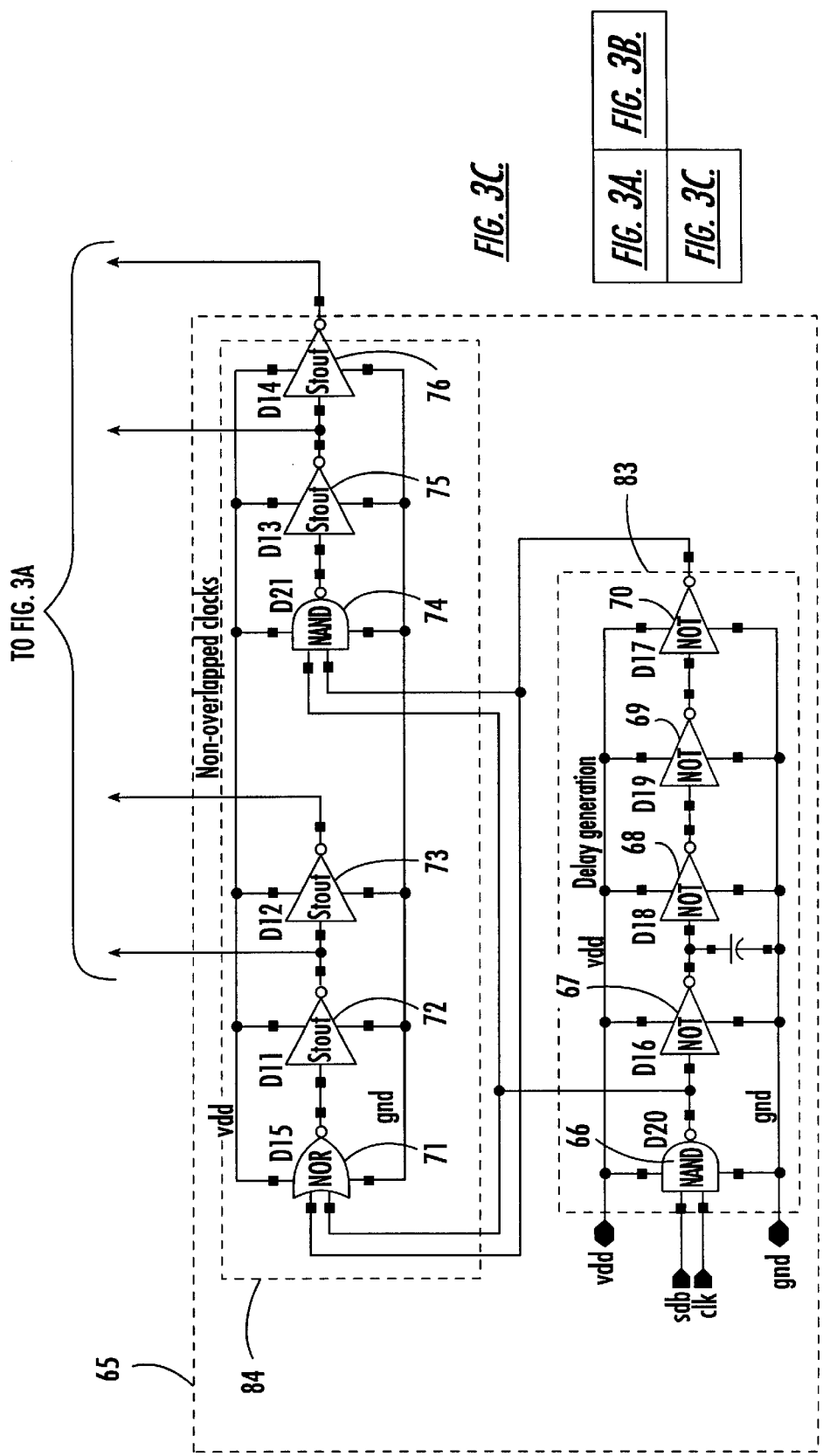

US 6,249,446 B1

CASCADABLE, HIGH EFFICIENCY CHARGE PUMP CIRCUIT AND RELATED METHODS

FIELD OF THE INVENTION

The present invention relates to the field of electronic circuits, and, more particularly, to charge pump circuits and related methods.

BACKGROUND OF THE INVENTION

Integrated circuits are typically supplied by one or more direct current (DC) power sources. Certain applications may require that an operating voltage which is higher or lower than the available supply voltages also be provided to the integrated circuit. For example, memory devices such as FLASH electrically erasable programmable read-only memories (EEPROMs) typically require such an operating voltage to perform read and write operations. Another example is a digital wristwatch, which needs a high voltage in order to drive the segments in its output display. Yet, in many instances it is not feasible to add an additional power source to provide the higher voltage.

An alternative to providing an additional, external power source is to use a charge pump circuit to generate a local-use supply voltage. A typical charge pump circuit includes one or more pumping capacitors that are selectively charged and discharged through a series of switches to boost the supply voltage and thereby provide the higher reference voltage. The switches are often driven by control signals having non-overlapping phases that are provided by an oscillator. Furthermore, the number of stages of switches and capacitors may be increased or cascaded to correspondingly increase the voltage boost by a desired multiple.

One example of a charge pump circuit providing a multiple voltage boost is U.S. Pat. No. 5,635,776 to Imi entitled "Charge Pump Voltage Converter." This charge pump circuit can generate a 4× or an 8× voltage boost and includes two pumping capacitors that are alternatingly controlled by a series of switches. The switches are each driven by respective phase signals that are generated using an oscillator and a frequency divider. While such a configuration does provide a significant voltage boost, it may not be feasible in applications where very little supply current is available because too much supply current may be consumed during the generation of the switch control signals. For the same reason, other prior art charge pump circuits that use multiple oscillators or other clock sources to provide the timing signals may also be inadequate where low current consumption is desirable, such as in portable battery powered devices.

SUMMARY OF THE INVENTION

In view of the foregoing background, it is therefore an object of the invention to provide a charge pump circuit that may be used in applications where low current consumption is desired.

This and other objects, features, and advantages in accordance with the present invention are provided by a charge pump circuit that includes at least one pumping capacitor (also known as a flying capacitor), a plurality of switches connected to the at least one pumping capacitor, and a controller for generating first and second sets of switch control signals for controlling the switches so that the at least one pumping capacitor generates an increased output voltage. More particularly, the controller preferably includes a clock having first outputs for the first set of switch control signals, a transient clamp network having second outputs for the second set of switch control signals, and a respective level shifting capacitor connected between each first output and a corresponding second output. The level shifting capacitors cooperate with the transient clamp network so that the second set of signals are level shifted from the first set. As a result, the second set of signals is produced with substantially no current consumption, which allows the charge pump circuit to be used in applications where low power consumption is desired.

The first set of switch control signals may include a first pair of control signals having opposite relative phases and a second pair of control signals also having phases opposite one another. The first set of control signals is driven into respective level shifting capacitors. The transient clamp network DC references its side of the capacitors to either an input or an output supply during an idling or off switch phase. The transient clamp network may include a plurality of MOS transistors, and each of the switches may be a MOS transistor as well.

A method for providing an increased output voltage according to the present invention preferably includes providing at least one pumping capacitor and a plurality of switches connected thereto, generating a first set of switch control signals, generating a second set of switch control signals by level shifting the first set of switch control signals, and controlling the plurality of switches based upon the first and second sets of switch control signals to generate the increased output voltage.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
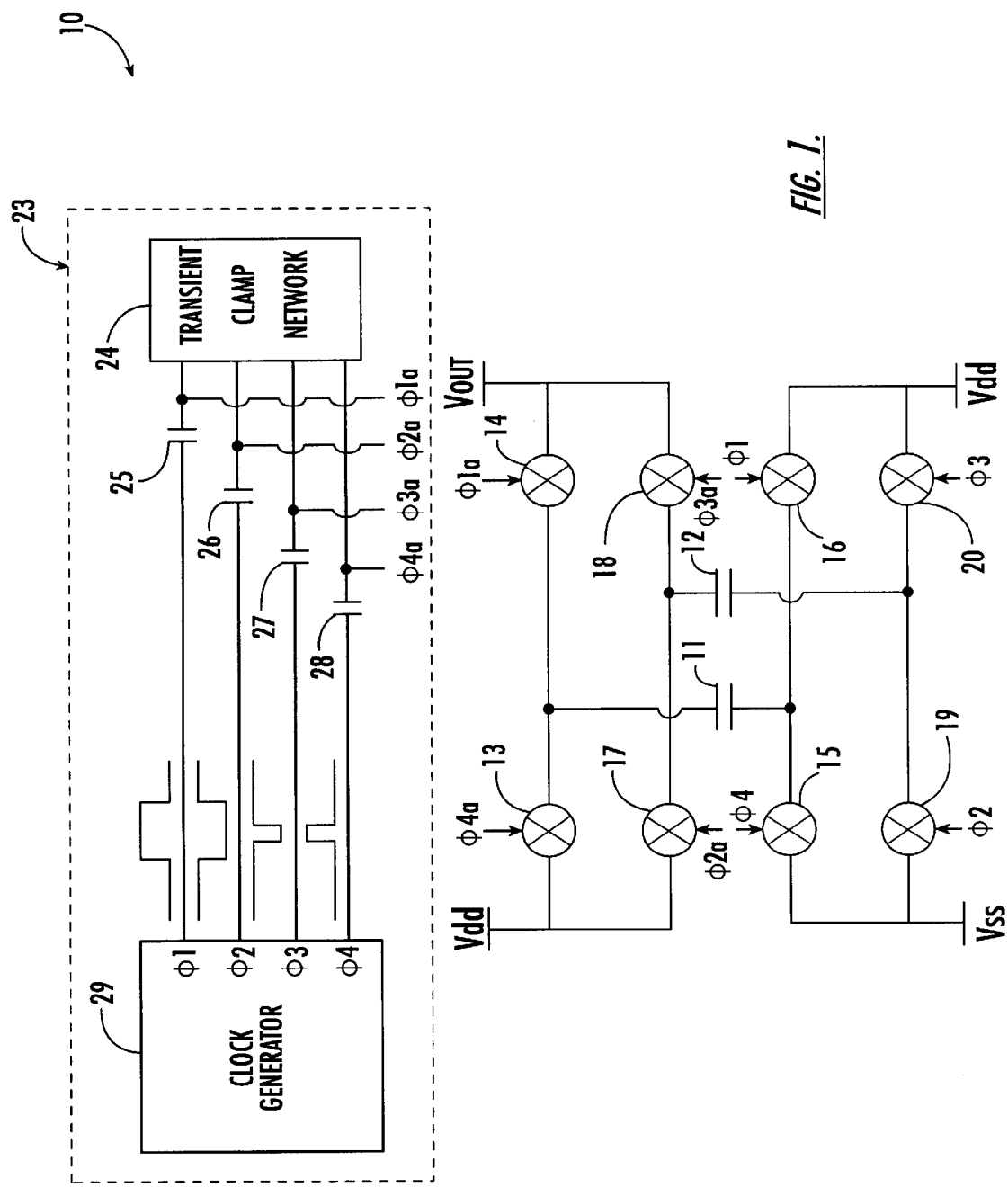
FIG. 1 is a schematic block diagram of a charge pump circuit according to the present invention.

Referring now to the schematic block diagram of FIG. 1, a charge pump circuit 10 according to the invention is first described. The charge pump circuit 10 provides an output voltage that is three times that of the supplied voltage Vdd, although higher or lower output voltages may be achieved through alternative embodiments, as will be described further below. The charge pump circuit 10 includes first and second pumping capacitors 11, 12. The first pumping capacitor 11 is connected to a first set of switches 13, 14, 15, 16, and the second pumping capacitor 12 is connected to a second set of switches 17, 18, 19, 20. The sets of switches 13–20 are driven by first and second sets of switch control signals ($\psi1$–$\psi4$ and $\psi1a$–$\psi4a$, respectively) having non-overlapped phases, as discussed further below, generated by a controller 23. The switches 14, 18, 16, 20 may be PFETs and the switches 13, 17, 15, 19 may be NFETs, for example, in which case the control logic polarity for the switches 14, 18, 16, 20 is inverse from that of switches 13, 17, 15, 19. In any implementation, the on-state control signals should not overlap so that switches 13 and 14 will be on at the same time. Likewise, the switch pairs 17, 18, 15, 16 and 19, 20 should not be on at the same time. That is, overlap in the on-state control signals for any of these pairs may diminish the operating efficiency of the charge pump.

It is important to note that the charge pump embodiment shown in FIG. 1 is a two-phase pump in that the two pumping capacitors 11, 12 serve exactly the same function but opposite one another. This redundancy improves the efficiency of the charge pump for little extra circuit area or cost, but is not absolutely necessary. One of the capacitors and the four switches directly attached to it could be removed, as will be appreciated by those of skill in the art.

The controller 23 includes a clock generator 29 that provides the first set of switch control signals ($\psi 1$–$\psi 4$) at its outputs. The controller 23 also illustratively includes a transient clamp network 24 having outputs providing the second set of switch control signals ($\psi 1a$–$\psi 4a$). A first level shifting capacitor 25 is connected between the $\psi 1$ output of the clock generator 29 and the $\psi 1a$ output of the transient clamp network. Similarly, a second level shifting capacitor 26 is connected between the $\psi 2$ and $\psi 2a$ outputs, a third level shifting capacitor 27 is connected between the $\psi 3$ and $\psi 3a$ outputs, and a fourth level shifting capacitor 28 is connected between the $\psi 4$ and $\psi 4a$ outputs. Other embodiments may have another set of level shifting capacitors and transient clamp network cascaded with the first to make a higher order charge pump, such as the tripler charge pump shown in FIG. 3, for example.

The level shifting capacitors 25, 26, 27, 28 cooperate with the transient clamp network 24 so that the second set of phase control signals is level shifted from the first set of phase control signals. That is, the four switch control signals are transmitted through the level shifting capacitors 25, 26, 27, 28, and the transient clamp network 24 provides proper DC biasing, or auto-zeroing, on the non-driven side of the level shifting capacitors. As a result, the charge pump circuit 10 derives its power from the Vdd, or input-supply side of the level shifting capacitors 25, 26, 27, 28, and therefore uses nearly none of the developed output power.

The four control signals and their level-shifted counterparts control the switches 13–20 so that the pumping capacitors 11, 12 alternatingly charge and discharge to provide the output voltage $V_{OUT}$, as will be readily appreciated by those of skill in the art. As may be seen in FIG. 1, the first set of switch control signals includes a first pair of non-overlapping control phase signals $\psi 1$, $\psi 2$ having opposite relative phases, and a second pair of control phase signals $\psi 3$, $\psi 4$ not overlapping the first pair. The control phase signals $\psi 3$, $\psi 4$ also have phases opposite one another. Because there is no overlapping of the switch control signals between $\psi 1$, $\psi 2$ and $\psi 3$, $\psi 4$ and nearly no explicit current usage on the non-driven side of the level shifting capacitors 25, 26, 27, 28, the charge pump circuit 10 operates with very high voltage conversion efficiency and power conversion efficiency, as will also be appreciated by those of skill in the art.

Of course, it will be apparent to those of skill in the art that the power conversion efficiency will vary depending upon the type and size of the components used and the current load placed on the charge pump output. For a supply voltage Vdd of 3.3 V, the charge pump set up as a tripler (as in FIG. 3) has been simulated and demonstrated to deliver approximately 1 $\mu$A at 99.7% voltage conversion efficiency. Higher output currents may be obtained with similar efficiency by using prudent selection of device sizes and operating conditions, as will be appreciated by those of skill in the art. The power conversion efficiency is dependent on the component sizes, operating speed, load and technology quality. Nonetheless, since the charge pump according to the present invention requires nearly no explicit consumption of output current to run the switches, it is more efficient than conventional charge pump circuits under the same conditions. Thus, the charge pump circuit 10 provides a local, efficient output voltage that is well suited to memory devices and micro-powered applications, such as display drivers or pass-gates for power switching, for example.

In addition to improvements to conventional charge pump applications, the charge pump circuit according to the present invention may be used in an additional class of possible applications, namely voltage multiplying using a charge pump. The developed output voltage of the charge pump circuit according to the present invention provides enhanced precision such that if a precision reference voltage is applied in place of the Vdd supply, the output could be used as a precision reference voltage as well. Such a reference voltage may be, within reason, any positive or negative multiple of the applied reference, even above or below existing supply voltages, as will be appreciated by those of skill in the art. Thus, in contrast to prior art devices, reference voltage multiplication is provided by the present invention without the need for a tedious and costly precision circuit and large amounts of supply current.

Figure 2:
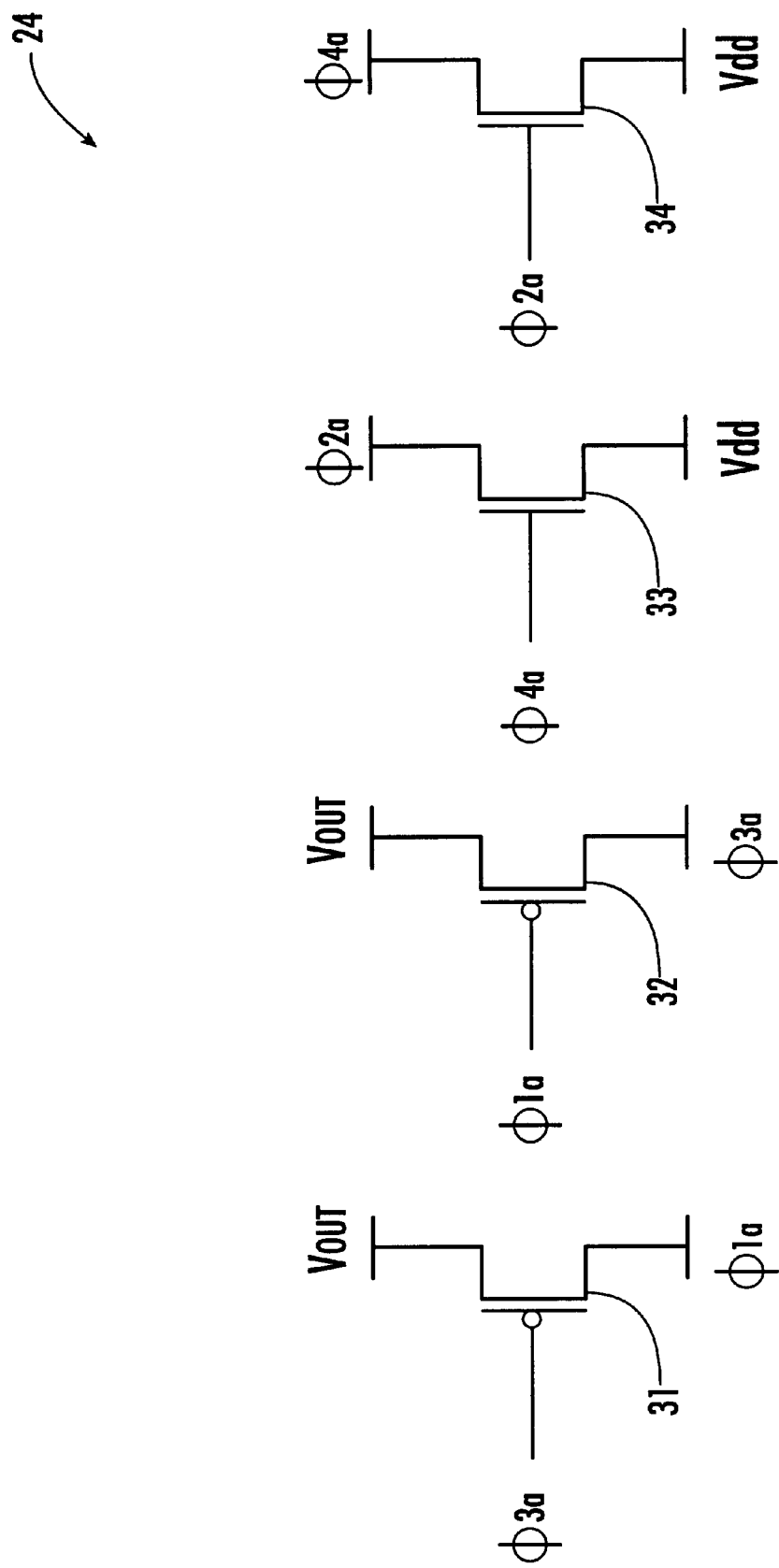
FIG. 2 is a schematic diagram of the transient clamp network of the charge pump circuit of FIG. 1.

The transient clamp network 24 may include four MOS transistors 31, 32, 33, 34, as shown in FIG. 2. The first transistor 31 is connected at its drain to $V_{OUT}$, at its gate to $\psi 3a$, and at its drain to $\psi 1a$. The second transistor 32 is connected at its source to $V_{OUT}$, at its gate to $\psi 1a$, and at its drain to $\psi 3a$. The third transistor 33 is connected at its drain to $\psi 2a$, at its gate to $\psi 4a$, and at its source to Vdd. Lastly, the fourth transistor 34 is connected at its drain to $\psi 4a$, at its gate to $\psi 2a$, and at its source to Vdd.

Figure 3A:
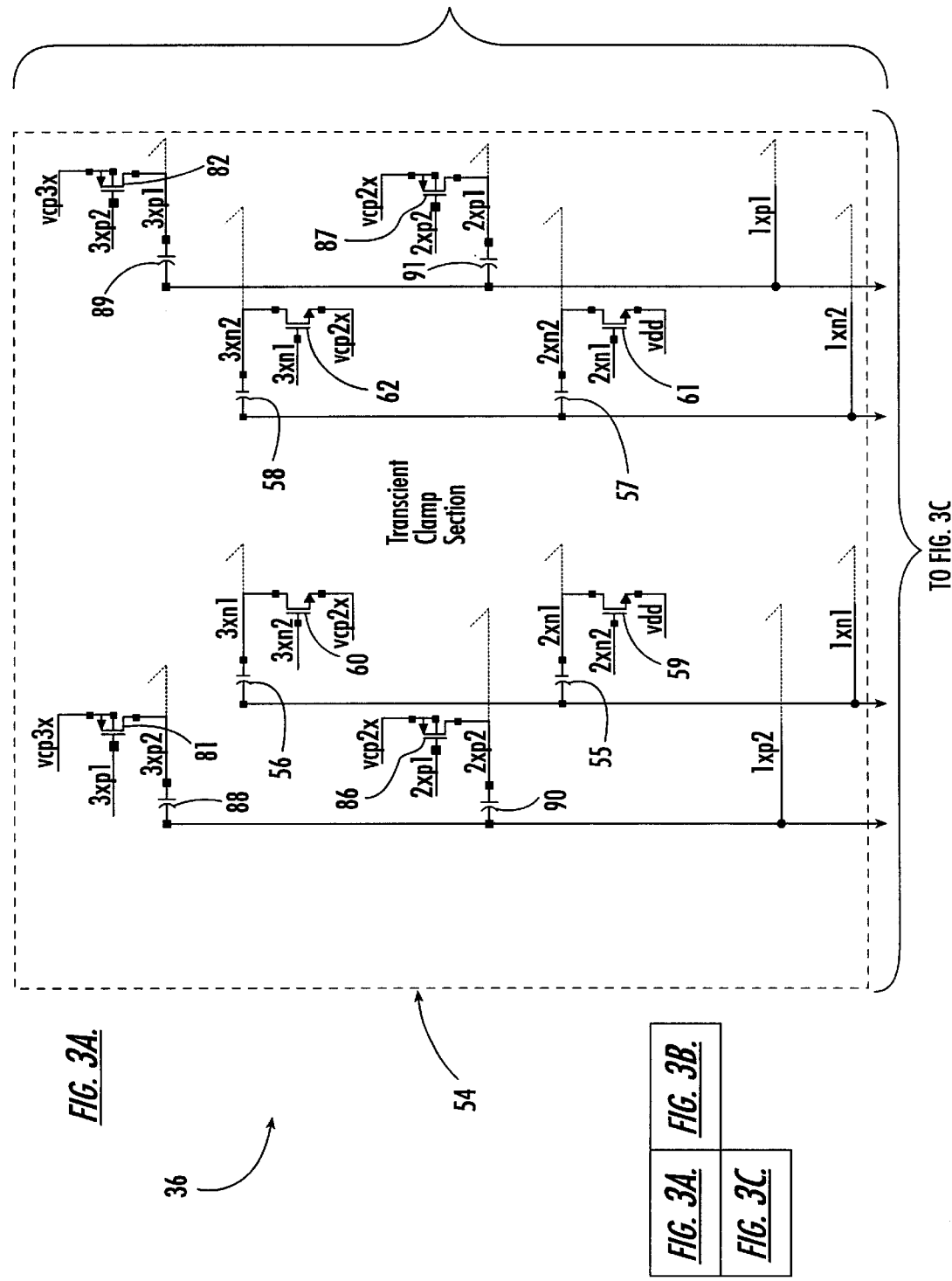
FIG. 3 is a detailed schematic diagram of a two-stage embodiment of the charge pump according to the present invention.

Turning now to FIG. 3, a detailed schematic of a charge pump circuit 36 according to another embodiment of the invention is shown. In contrast to the charge pump circuit 10 of FIG. 1, the charge pump circuit 36 is a two-stage pump which triples, rather than doubles, the Vdd supply voltage applied to it. This embodiment includes multiple pumping capacitors 37, 39, for the doubler section (2× pump) and 38, 40 for the tripler section (3× pump). The pumping capacitors 37, 38, 39, 40 may be of any type such as poly-oxide-poly or poly-oxide-silicon capacitors, for example. Furthermore, the charge pump circuit may, and typically will, also include additional storage capacitors 41, 42 to improve performance, as will be appreciated by those of skill in the art. The MOS transistors 43, 44, 45, 46, are the switches for the doubler pump section and MOS transistors 47, 48, 49, 50 are the switches for the tripler pump section. Transistors 77, 78, 79, 80 at the base of the pump serve the function of the switches 20, 15, 16, 19, respectively, of FIG. 1.

The charge pump circuit 36 also includes a transient clamp network 54 including level shifting capacitors 55, 90, 57, 91 and MOS transistors 59, 86, 61, 91 which couple to the gates of pump switch transistors 45, 44, 46, 43, respectively, to operate the doubler charge pump section. Likewise, level shifting capacitors 56, 88, 58, 89 and MOS transistors 60, 88, 62, 82, which couple to gates of pump switch transistors 49, 48, 50, 47, operate the tripler charge pump stage of the charge pump circuit 36. Of course, further stages can be cascaded in similar fashion. Also, the stages could be connected sequentially such that the first stage doubles, the second quadruples, the third octuples, and so on, as will be appreciated by those of skill in the art.

The charge pump circuit 36 illustrated in FIG. 3 provides an increased voltage output that is three times that of the supply voltage Vdd through the two successive pumping capacitor sections (2×pump and 3×pump). Those of skill in the art will appreciate that additional pumping capacitor stages may be added to the charge pump circuit 36 to provide an additional voltage boost or additional current. Such additional cascaded stages may have their level shifting capacitors connected either in parallel or in series with the level shifting capacitors of the previous stage. Those skilled in the art will also recognize that this style of charge pump can be connected in a converse fashion with appropriate selection of FET types and related drive signals, such that the output voltage developed is a negative multiple of the supply voltage applied. Of course, all the advantages are maintained for all such embodiments of this invention.

The charge pump circuit 36 also illustratively includes a non-overlapped clock generator 65 including a delay generation stage 83 including a NAND gate 66 connected at its output to four inverters 67, 68, 69, 70, which are connected in series. The delay generation stage provides the input for a clock stage 84 which generates the control phase signals noted above. The clock stage 84 includes a first clock comprising a NOR gate 71 connected in series to inverters 72, 73, and a second clock comprising a NAND gate 74 connected in series to inverters 75, 76. The first and second clocks provide the two pairs of non-overlapping phase control signals to the transient clamp network 54, as described above. Of course, other clock generators may also be used, as will be appreciated by those of skill in the art.

A method for providing an increased output voltage according to the present invention includes providing pumping capacitors 11, 12 and providing switches 13–20 connected to the pumping capacitors. The method further includes generating a first set of switch control signals ($\psi 1$–$\psi 4$), generating a second set of switch control signals ($\psi 1a$–$\psi 4a$) by level shifting the first set of switch control signals, and controlling the switches 13–20 based upon the first and second sets of switch control signals to generate the increased output voltage $V_{OUT}$.

Generating the first set of switch control signals may include generating first and second pairs of control signals $\psi 1$, $\psi 2$ and $\psi 3$, $\psi 4$, respectively) having opposite relative phases. The first and second pairs of control signals may be generated to be non-overlapping. The first set of phase control signals may be generated based upon a supply voltage, and at least one of the second set of phase control signals may be level shifted from the first set of phase control signals based upon the output voltage $V_{OUT}$.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A charge pump circuit comprising:

at least one pumping capacitor;

a plurality of switches connected to said at least one pumping capacitor; and a controller for generating first and second sets of switch control signals for controlling said switches in cooperation with said at least one pumping capacitor to generate an output voltage, said controller comprising a clock having first outputs for the first set of switch control signals, a transient clamp network having second outputs for the second set of switch control signals, and a respective level shifting capacitor connected between each first output and a corresponding second output and cooperating with said transient clamp network so that the second set of switch control signals is level shifted from the first set.

2. The charge pump circuit of claim 1 wherein said first set of switch control signals comprises a first pair of control signals having opposite relative phases and a second pair of control signals having opposite relative phases.

3. The charge pump circuit of claim 2 wherein said first and second pairs of control signals are non-overlapping.

4. The charge pump circuit of claim 1 wherein the output voltage is negative.

5. The charge pump circuit of claim 1 wherein said transient clamp network comprises a plurality of transistors.

6. The charge pump circuit of claim 5 wherein each of said plurality of transistors comprises a MOS transistor.

7. The charge pump circuit of claim 1 wherein each of said switches comprises a MOS transistor.

8. The charge pump circuit of claim 1 wherein the first set of switch control signals is based upon a supply voltage.

9. The charge pump circuit of claim 1 wherein at least one of the second set of switch control signals is based upon the output voltage.

10. A charge pump circuit comprising:

at least one pumping capacitor;

a plurality of switches connected to said at least one pumping capacitor; and a controller for generating first and second sets of switch control signals for controlling said switches so that said at least one pumping capacitor generates an increased output voltage, the first set of switch control signals being based upon a supply voltage and the second set of switch control signals being capacitively level shifted from the first set of switch control signals.

11. The charge pump circuit of claim 10 wherein said controller comprises:

a clock having first outputs for the first set of switch control signals;

a transient clamp network having second outputs for the second set of switch control signals; and a respective level shifting capacitor connected between each first output and a corresponding second output and cooperating with said transient clamp network so that the second set of switch control signals is level shifted from the first set.

12. The charge pump circuit of claim 10 wherein the output voltage is negative.

13. The charge pump circuit of claim 11 wherein said transient clamp network comprises a plurality of transistors.

14. The charge pump circuit of claim 13 wherein each of said plurality of transistors comprises a MOS transistor.

15. The charge pump circuit of claim 10 wherein said first set of switch control signals comprises a first pair of control signals having opposite relative phases and a second pair of control signals having opposite relative phases.

16. The charge pump circuit of claim 15 wherein said first and second pairs of control signals are non-overlapping.

17. The charge pump circuit of claim 10 wherein each of said plurality of switches comprises a MOS transistor.

18. A method for providing either an increased or a negative output voltage comprising:
   providing a at least one pumping capacitor and providing a plurality of switches connected thereto;
   generating a first set of switch control signals;
   generating a second set of switch control signals by level shifting the first set of switch control signals; and
   controlling the plurality of switches based upon the first and second sets of switch control signals so that the at least one pumping capacitor generates the increased output voltage.

19. The method of claim 18 wherein generating the first set of switch control signals comprises:
   generating a first pair of control signals having opposite relative phases; and
   generating a second pair of control signals having opposite relative phases.

20. The method of claim 19 wherein generating the first and second pairs of control signals comprises generating the first and second pairs of control signals to be non-overlapping.

21. The method of claim 18 wherein generating the first set of phase control signals comprises generating the first set of phase control signals based upon a supply voltage.

22. The method of claim 18 wherein generating the second set of phase control signals comprises level shifting at least one of the first set of phase control signals based upon the output voltage.

* * * * *

UNITED STATES PATENT AND TRADEMARK OFFICE
CERTIFICATE OF CORRECTION

PATENT NO. : 6,249,446 B1  
DATED : June 19, 2001  
INVENTOR(S) : William Brandes Shearon, Salomon Vulih, Robert Haynes Isham It is certified that error appears in the above-identified patent and that said Letters Patent is hereby corrected as shown below:

Column 2,
Line 67, delete "($\psi$1-$\psi$4 and $\psi$1a-$\psi$4a," insert -- ($\phi$1-$\phi$4 and $\phi$1a-$\phi$4a, --

Column 3,
Line 21, delete "($\psi$1-$\psi$4)" insert -- $\phi$1-$\phi$4 --
Line 24, delete "($\psi$1a-$\psi$4a)" insert -- ($\phi$1a-$\phi$4a) --
Line 25, delete "$\psi$1" insert -- $\phi$1 --
Line 26, delete "$\psi$1a" insert -- $\phi$1a --
Line 28, delete "the $\psi$2 and $\psi$2a outputs" insert -- the $\phi$2 and $\phi$2a outputs --
Line 29, delete "$\psi$3" insert -- $\phi$3 --
Line 30, delete "$\psi$3a" insert -- $\phi$3a --
Line 31, delete "the $\psi$4 and $\psi$4a outputs." insert -- the $\phi$4 and $\phi$4a outputs. --
Line 54, delete "$\psi$1, $\psi$2" insert -- $\phi$1, $\phi$2 --
Lines 56 and 57, delete "$\psi$3, $\psi$4" insert -- $\phi$3, $\phi$4 --
Line 59, delete "$\psi$1, $\psi$2 and $\psi$3,$\psi$4" insert -- $\phi$1, $\phi$2 and $\phi$3, $\phi$4 --

Column 4,
Line 37, delete "$\psi$3a, and at its drain to $\psi$1a." insert -- $\phi$3a, and at its drain to $\phi$1a. --
Line 38, delete "$\psi$1a," insert -- $\phi$1a, --
Line 39, delete "$\psi$3a." insert -- $\phi$3a. --
Line 40, delete "to $\psi$2a, at its gate to $\psi$4a," insert -- to $\phi$2a, at its gate to $\phi$4a, --
Line 41, delete "drain to $\psi$4a," insert -- drain to $\phi$4a, --
Line 42, delete "gate to $\psi$2a," insert -- $\phi$2a, --

Column 5,
Line 42, delete "($\psi$1-$\psi$4)," insert -- ($\phi$1-$\phi$4), --
Line 43, delete "($\psi$1a-$\psi$4a)" insert -- ($\phi$1a-$\phi$4a) --
Line 49, delete "$\psi$1, $\psi$2 and $\psi$3,$\psi$4, respectively)" insert -- $\phi$1, $\phi$2 and $\phi$3, $\phi$4, respectively) --

Signed and Sealed this

Twenty-second Day of January, 2002

*Attest:*

*Attesting Officer*

JAMES E. ROGAN  
*Director of the United States Patent and Trademark Office*